United States Patent
Hua et al.

(10) Patent No.: US 9,362,772 B2
(45) Date of Patent: Jun. 7, 2016

(54) SYSTEM AND METHOD FOR BALANCING VOLTAGES

(71) Applicant: TEXAS INSTRUMENTS INCORPORATED, Dallas, TX (US)

(72) Inventors: Jun J. Hua, Plano, TX (US); Mustapha Elmarkhi, Richardson, TX (US); Ken R. King, Lucas, TX (US); John M. Ross, Olney, MD (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 248 days.

(21) Appl. No.: 13/776,913

(22) Filed: Feb. 26, 2013

(65) Prior Publication Data

US 2014/0049224 A1 Feb. 20, 2014

Related U.S. Application Data

(60) Provisional application No. 61/683,129, filed on Aug. 14, 2012.

(51) Int. Cl.
*H02J 7/00* (2006.01)

(52) U.S. Cl.
CPC ............. *H02J 7/0068* (2013.01); *H02J 7/0016* (2013.01); *Y02T 10/7055* (2013.01)

(58) Field of Classification Search
None
See application file for complete search history.

(56) References Cited

U.S. PATENT DOCUMENTS

| | | | | |
|---|---|---|---|---|
| 5,153,496 A * | 10/1992 | LaForge | ......................... | 320/119 |
| 6,043,636 A * | 3/2000 | Gaudreau et al. | ............. | 323/282 |
| 7,821,229 B2 * | 10/2010 | Wang et al. | .................... | 320/118 |
| 7,825,628 B2 | 11/2010 | Kuroda | | |
| 7,973,514 B2 * | 7/2011 | Gong et al. | .................... | 320/122 |
| 7,977,926 B2 * | 7/2011 | Williams | ............ | H02M 3/1582 323/223 |
| 8,259,424 B1 * | 9/2012 | Lin | ...................... | H03M 1/1295 361/111 |
| 2004/0032236 A1 | 2/2004 | Canter | | |
| 2007/0090799 A1 | 4/2007 | Lee et al. | | |
| 2009/0079391 A1 * | 3/2009 | Lupu et al. | ..................... | 320/122 |
| 2010/0033128 A1 | 2/2010 | Densham et al. | | |

FOREIGN PATENT DOCUMENTS

| | | |
|---|---|---|
| EP | 2448038 | 5/2012 |
| JP | 2007318950 A | 12/2007 |

OTHER PUBLICATIONS

PCT Search Report mailed Nov. 26, 2013.

* cited by examiner

*Primary Examiner* — Leigh Garbowski
(74) *Attorney, Agent, or Firm* — William B. Kempler; Frank D. Cimino (57) ABSTRACT

A circuit providing voltage cell balancing is provided. The circuit includes a cell balancing network comprising separate switching circuits, each being configured to balance a respective cell voltage for a respective cell of a plurality of voltage cells based on a respective switching control signal. A control circuit includes a plurality of current sources, each of the plurality of current sources selectively connected to a respective one of the separate switching circuits to independently control operation of each of the separate switching circuits of the cell balancing network to balance the voltage across the plurality of voltage cells.

18 Claims, 5 Drawing Sheets

SYSTEM AND METHOD FOR BALANCING VOLTAGES

CROSS-REFERENCE TO RELATED APPLICATION

This application claims the benefit of U.S. Provisional Patent Application 61/683,129 filed on Aug. 14, 2012, and entitled A LOW-COST SIMULTANEOUS CELL BALANCING CIRCUIT WITH ADAPTIVE CLAMPING FOR MULTI-CELL BATTERY APPLICATIONS, the entirety of which is incorporated by reference herein.

TECHNICAL FIELD

This disclosure relates to a circuit to provide cell balancing for multi-cell batteries.

BACKGROUND

Li-Ion battery packs that consist of more than one Li-Ion battery cells connected in series are commonly used in applications such as notebook PCs, cordless power tools, electric vehicles, uninterruptable power supplies, and so forth. An important function of the battery management circuitry for such packs—typically an Integrated Circuit (IC), is to manage cell balancing, which is important to the overall battery pack capacity and runtime. Cell balancing is the process of matching the voltage across each individual cell in the battery pack. Unbalanced cells can lead to premature charge termination, early discharge termination, or further cell abuse from cycling above or below optimal cell voltage limits.

Many factors can cause cell imbalance, such as cell-to-cell capacity mismatch, state-of-charge difference, cell impedance variation, temperature gradients, and cell self-heating at high discharge rates. Various methods and algorithms have been developed to balance cells in multi-cell battery packs for optimal performance. For example, passive ("bleed") balancing shunts energy around a cell by converting it to heat in a bypass power resistor and a switch, typically a Field Effect Transistor (FET), while charge shuffling methods capacitively redistribute energy between the cells.

Each cell balancing method has its own advantages and disadvantages. Passive balancing is usually considered as the least expensive approach because it does not require a discrete capacitor or inductor. The balancing control algorithm is relatively simple although the excess energy is essentially wasted as heat, and in many cases, it is still the method of choice due to its low cost in both hardware and software/firmware. In other cell balancing schemes, external transistor networks may be employed to balance voltages across the cells, however, such external networks require additional integrated circuit control pins to operate the transistors which can lead to increased circuit costs.

SUMMARY

This disclosure relates to a system and method to provide voltage cell balancing for multi-cell applications.

In one example, a circuit providing voltage cell balancing is provided. The circuit includes a cell balancing network comprising separate switching circuits, each being configured to balance a respective cell voltage for a respective cell of a plurality of voltage cells based on a respective switching control signal. A control circuit includes a plurality of current sources, each of the plurality of current sources selectively connected to a respective one of the separate switching circuits to independently control operation of each of the separate switching circuits of the cell balancing network to balance the voltage across the plurality of voltage cells.

In another example, a circuit includes a cell balancing network comprising separate switching circuits, each being configured to balance a respective cell voltage for a respective cell of a plurality of voltage cells based on a respective switching control signal. The circuit includes a control circuit connected to provide a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network. The circuit also includes an adaptive clamp circuit connected between each pair of adjacent cell inputs, each adaptive clamp circuit being configured to shunt excessive current to inhibit unintended activation of one of the separate switching circuits that is coupled to the pair of adjacent cell inputs when another of the pair is balancing.

In yet another example, a method includes balancing a cell voltage for a respective cell of a plurality of voltage cells based on a respective switching control signal. The method includes providing a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network. The method also includes dynamically clamping each pair of adjacent cell inputs by shunting excessive current to inhibit unintended activation of one of the separate switching circuits that is coupled to the pair of adjacent cell inputs when another of the pair is balancing.

DETAILED DESCRIPTION

Figure 1:
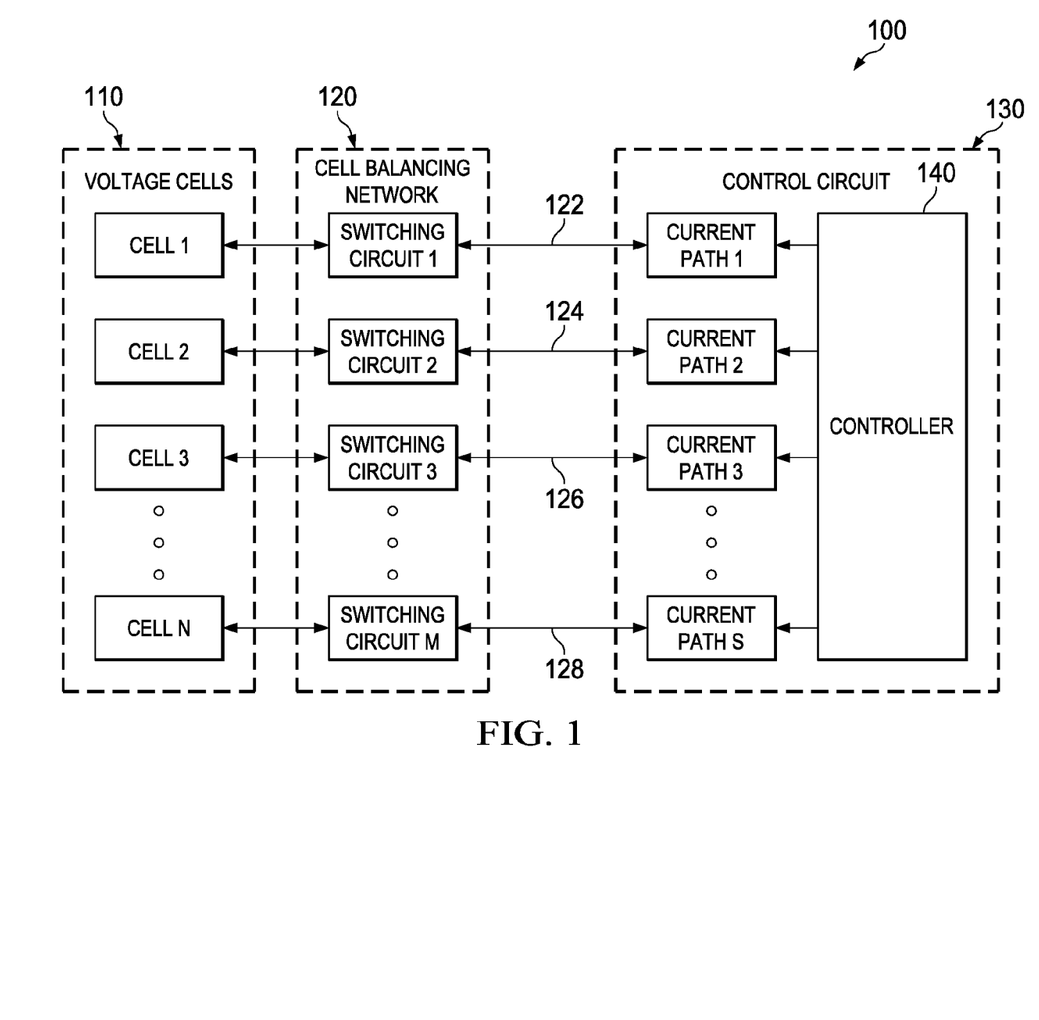
FIG. 1 illustrates a cell balancing circuit for multi-cell voltage applications.

FIG. 1 illustrates a cell balancing circuit 100 for multi-cell applications. The cell balancing circuit 100 can be employed to balance the voltage across multiple voltage cells 110 and shown as cells 1 through N, with N being a positive integer. As used herein, the term voltage cell can refer to substantially any type of component or circuit location that a voltage can be developed across. In one voltage cell example, a battery can function as a voltage cell. In another cell example, one or more resistors can function as the cell. Other examples include single or multiple capacitor circuits, diode circuits, transistor circuits, and so forth. Voltage cells can also include circuit combinations such as resistor/capacitor networks or semiconductor networks that are capable of developing a voltage and can be balanced according to the systems and methods described herein.

The cell balancing circuit includes a cell balancing network 120 comprising separate switching circuits 1 through M, with M being a positive integer, wherein each switching circuit can be configured to balance a voltage across each of a plurality of voltage cells 110 based on a respective switching control signal shown at reference numerals 122 through 128. Each of the control signals 122-128 can also operate as inputs to provide a current path (e.g., sink or source) that draw current from the voltage cells 110 in order to balance the voltage across the respective cells. As used herein, the current path can be provided by sink or source circuits which are illustrated and described in more detail below. By utilizing the control signals 122-128 as both output controls to activate the switching circuits in the cell balancing network 120 and as inputs to draw current from the voltage cells 110, connection pins can be reduced on a control circuit integrated circuit (IC) 130 which operates the cell balancing network 120. By reducing pins on the control circuit 130, complexity and cost of the circuit can be mitigated.

The control circuit 130 can be connected to draw current from each of the plurality of voltage cells 110 via current paths 1-S, with S being a positive integer. As shown, a controller 140 can operate a switching algorithm and/or hard-wired control circuits to operate the current paths 1-S. The control circuit 140 balances the voltage across the plurality of voltage cells 110 by drawing current from one or more of the voltage cells 110 in a concurrent manner via the current paths 1-S, wherein each respective cell input of the control circuit 130 further provides the respective switching control signal 122-128 to independently control operation of each separate switching circuit 1-M of the cell balancing network 120.

As used herein, the term controller can be a processor operating firmware to control operation of the current paths 1-S and control signals 122-128. In another example, the controller 140 could be a hard-wired function wherein dedicated logic and switching elements control the current paths 1-S and control signals 122-128. In yet another example, a combination of programmed elements and circuit logic elements could cooperate to perform the operation of the controller 140.

It is noted that the examples described herein can be provided via different analog and/or digital circuit implementations which can include integrated circuit and/or discrete circuit implementations. For instance, in some cases, field effect transistors can be employed and in other cases junction transistors or diodes employed. Some control components can be employed as discrete or integrated circuit implementations such as a comparator comparing a reference signal to a control signal and in other examples, controllers operating via processor instructions and exchanging data via D/A and A/D converters could be employed to monitor reference voltages and generate control signals within the circuit 100. All or portions of the example circuits described herein can be integrated such as in an integrated circuit.

The circuit 100 provides concurrent and passive cell balancing for multi-cell voltage (e.g., LI-Ion battery) management applications. Conventional cell balancing circuits using integrated on-chip switches cannot balance the adjacent cells at the same time, while existing solutions using discrete components utilize a dedicated control pin for each balancing switch. Neither approach is suitable for applications that require fast balancing and low cost. The circuit 100 can employ external power transistors in the switching circuits 1-M, with M being a positive integer, as the balancing switch, which supports high balancing current. The gate control of the balancing switching circuit 1-M (e.g., FET, junction transistor) can be realized by creating a voltage drop across a cell input filter resistor (shown and described below with respect to FIG. 2) with an internal current source. An adaptive clamping circuit (See FIG. 3 below) can direct excessive current away from the cell input pin, if necessary, and thus maintain the maximum gate drive voltage available to the external balancing network 120.

Figure 2:
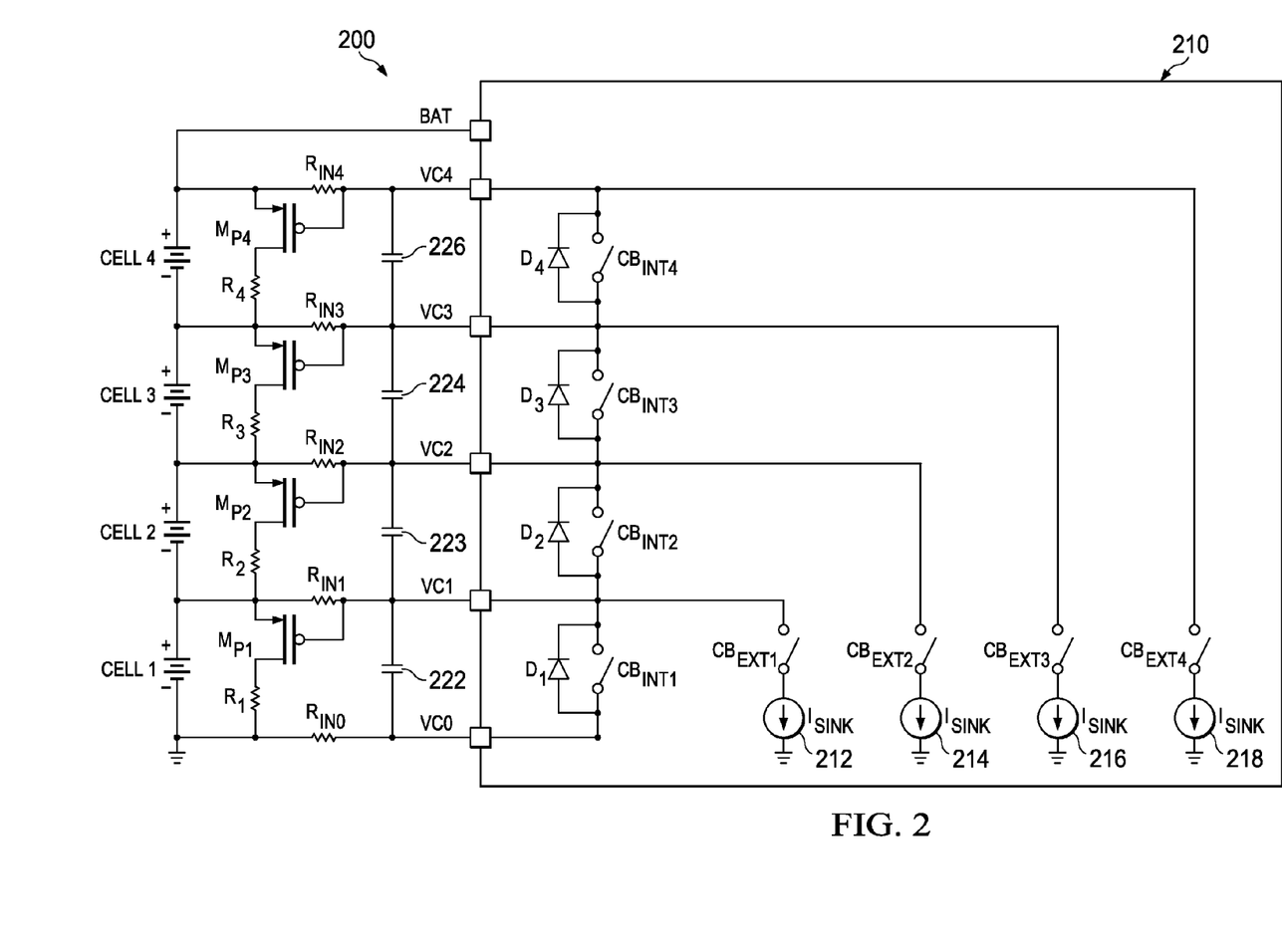
FIG. 2 illustrates an example balancing circuit that employs external switching components to balance voltages across voltage cells.

FIG. 2 illustrates an example balancing circuit 200 that employs external switching components to balance voltages across voltage cells and shown as cells 1 through 4 in this example. The balancing circuit 200 includes a controller IC 210 that operates current sinks 212-218 via control switches CBext1-CBext4. The controller IC 210 also operates an external cell balancing network that includes of FET's MP1 through MP4. Each of the respective FET's may include source resistors R1-R4, drain resistors RIN1-RIN4, and capacitors 222-226.

The circuit 200 can be configured such that the cell input filter resistors RIN1-RIN4 are connected between the source and gate terminals of the external P-channel MOSFETs. In other examples, external N-channel MOSFET's could also be employed as will be shown and described below with respect to FIG. 4. Controlled by switch $CB_{EXTn}$, with n representing a positive integer, an internal current source ISINK can pull down pin VCn and establish a gate drive voltage for the external balancing FET MP1-MP4, where:

$$|V_{GSn}| = R_{1Nn} \times I_{SINK} \qquad \text{Equation (1)}$$

As long as the gate drive is higher than the threshold voltage of the external balancing FET MP1-MP4, all cells can be balanced concurrently while no dedicated control pins for MP1-MP4 are required.

It may be possible for the circuit 200 to turn on the external balancing FET of a cell which is not intended to be balanced. For example, if $CB_{EXT4}$ is on and $CB_{EXT1}$-$CB_{EXT3}$ are off, only Cell 4 should be balanced. Thus, substantially no current should be flowing in RIN0-RIN3. However, as a result of the balancing, VCELL4 may drop to point such that:

$$V_{CELL4} < R_{IN4} \times I_{SINK} \qquad \text{Equation (2)}$$

and $$VC4 < VC3 - V_D \qquad \text{Equation (3)}$$

where VD is the voltage drop across the body diode of $CB_{INT4}$ (D4). When this body diode turns on, part of ISINK will be flowing through RIN3 to VC3, then to VC4. Due to the voltage drop across RIN3 in this hypothetical example, the balancing FET MP3 may be turned on which may be undesirable.

To prevent VCN from dropping below VCN−1, a designer may select the values of RINn and ISINK such that the voltage drop across RINn is lower than VCELL. Due to the variation of VCELL however, the product of RINn*ISINK may have to be set to be smaller than the lower limit of VCELL. A potential issue with this approach is that the external balancing FET may not have enough gate drive to fully turn on when VCELL is at its higher end.

Another technique to address the body diode issue is to add additional circuitry to switch the back gate connections of the internal balancing FETs. For example, a comparator may be used to monitor the voltage of VCN and VCN−1. The output can be used to control a switch that connects the back gate of MPn, $CB_{EXTn}$, to VCN or VCN−1, whichever is higher. For multi-cell voltage applications, especially with high cell count, this solution may be expensive since high voltage comparators and analog switches can require large silicon areas. As a further lower cost example that can effectively address this issue, an adaptive clamping circuit can be employed as shown in FIG. 3.

Figure 3:
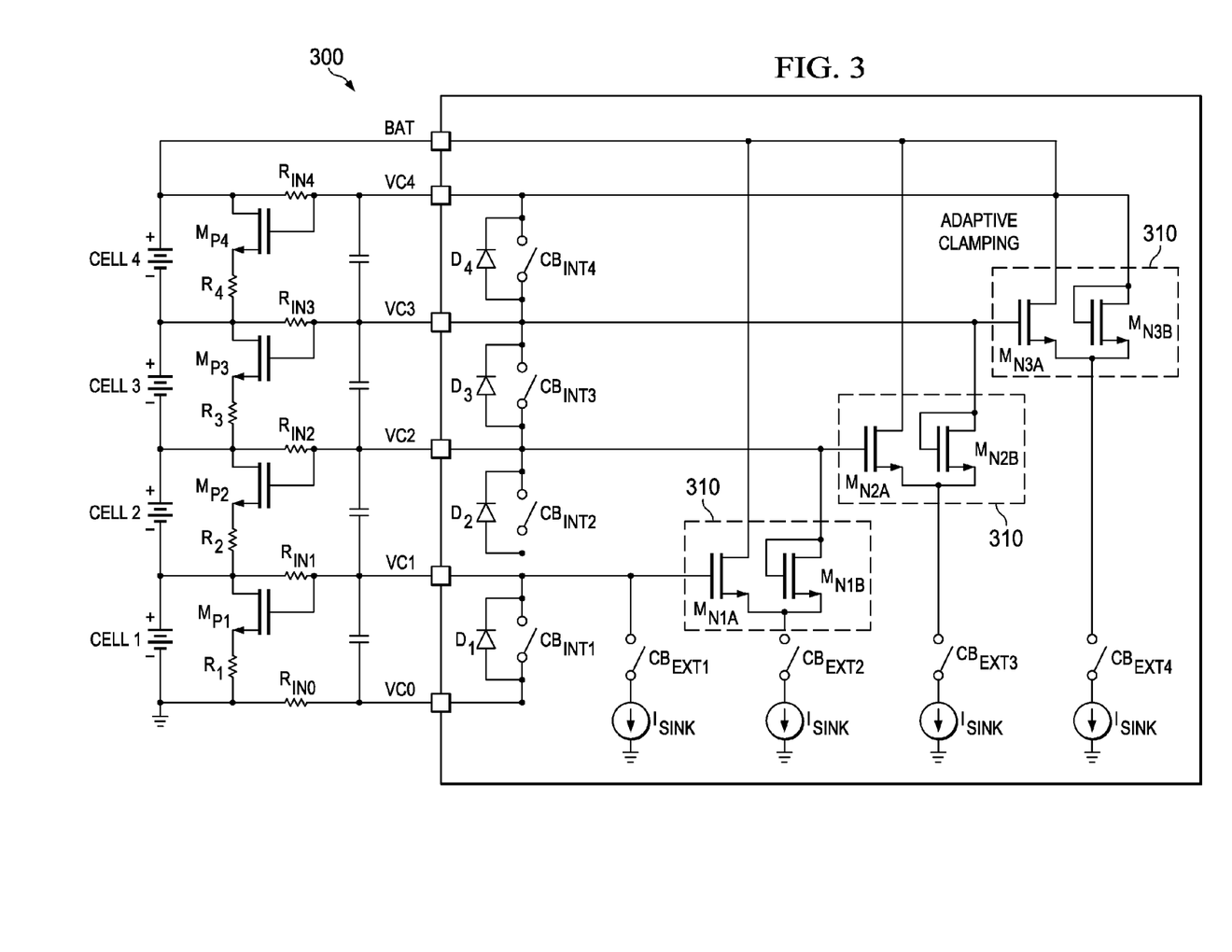
FIG. 3 illustrates an example balancing circuit that employs external PMOS switching components and an adaptive clamping circuit to balance voltages across voltage cells.

FIG. 3 illustrates an example balancing circuit 300 that employs external PMOS switching components and an adaptive clamping circuit to balance voltages across voltage cells. As noted above, an issue with lower VCELL voltages, is the current source ISINK may become excessive and cause RINn*ISINK>VCELL. If the excessive current can be shunted to somewhere else, VCN may not drop below VCN−1 and the body diode of the internal balancing FETs may not turn on. This operation can be performed by adding two small FETs and shown as an adaptive clamp at 310. As shown in the circuit 300, MN3A and MN3B of the adaptive clamp 310 share a common source, where MN3A has its gate connected to VC3 and its drain connected to BAT. The FET MN3B can be configured as a diode and the gate/drain can be connected to VC4, for example.

When the balancing of Cell 4 is active, for example, and if VC4 is higher than VC3, the ISINK current can flow through MN3B and substantially no current flows in MN3A. The external balance FET MP4 may still receive the maximum available gate drive, which is set by RIN4*ISINK. When VC4 goes toward and drives close to VC3, MN3A can begin to conduct and shunt the excessive current to BAT. If MN3A and MN3B are matched, VC4 can be clamped at approximately VC3 regardless of the cell voltage VCELL4. In one example, the clamping circuit 310 can clamp VC4 to be no lower than VC3 by approximately 100 mV, which is generally small enough to prevent the body diode of D4 from turning on. In this case, the external balancing FET MP4 still has the maximum available gate drive, which is about equal to the cell voltage. A similar clamping circuit works for the balancing of Cell 3 and Cell 2 as shown. For Cell 1, the clamping circuit is not needed because when VC1 approaches VC0, which is at ground potential, ISINK can lose headroom and thus can be reduced automatically.

Figure 4:
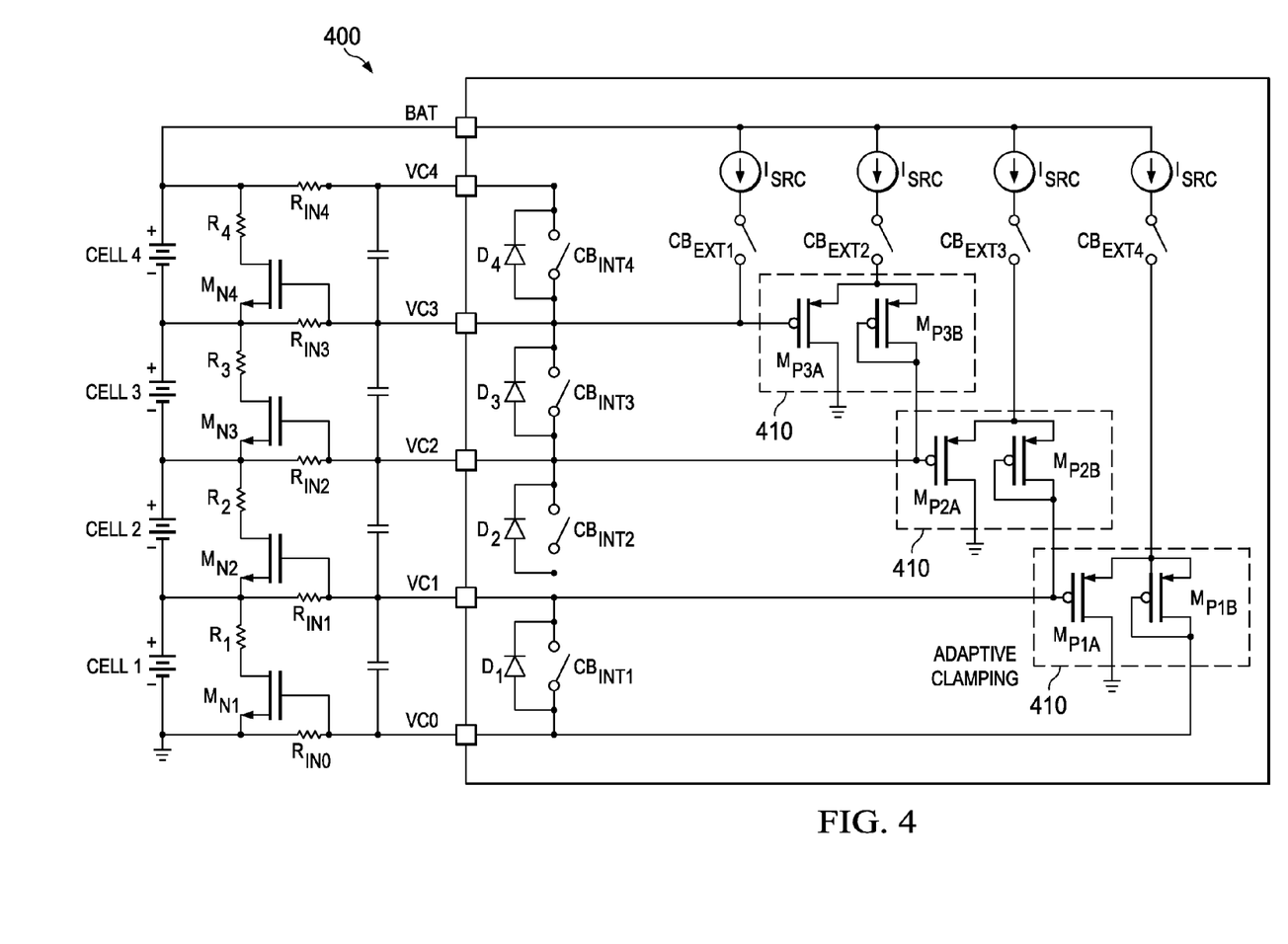
FIG. 4 illustrates an example balancing circuit that employs external NMOS switching components and an adaptive clamping circuit to balance voltages across voltage cells.

FIG. 4 illustrates an example balancing circuit 400 that employs external NMOS switching components and an adaptive clamping circuit to balance voltages across voltage cells. In the example circuit 400, an adaptive clamping circuit can be provided as shown at 410. The gate drive of MN1-MN4 can be set by ISRC*RINn. As shown, instead of current sinks, current sources can be employed to drive external NMOS switching and balancing circuits. When VCN rises to approaching VCN+1, the adaptive clamping circuit 410 can shunt the excessive current to ground.

Figure 5:
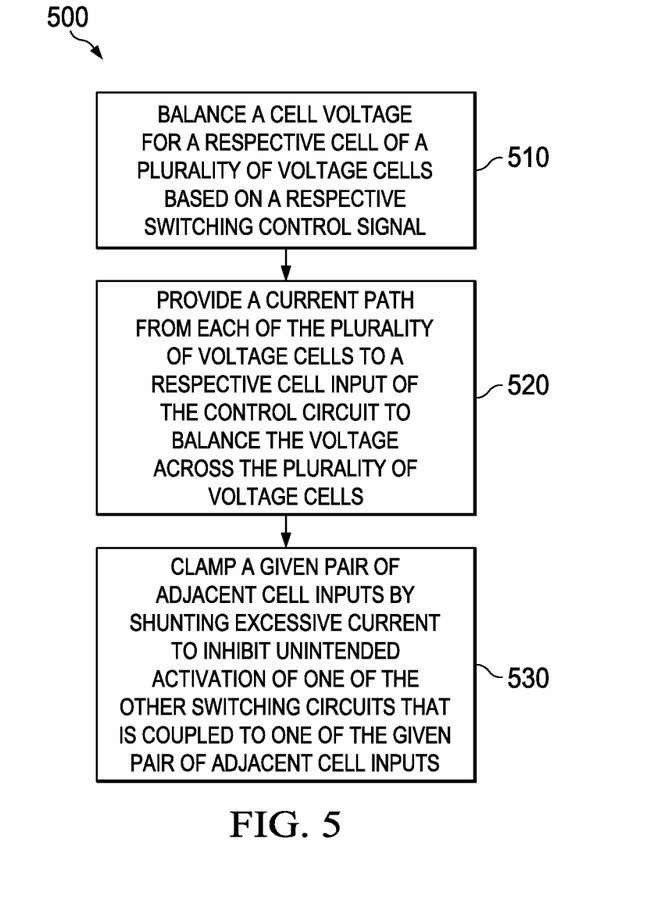
FIG. 5 illustrates a cell balancing method for multi-cell voltage applications.

FIG. 5 illustrates a cell balancing method 500 for multi-cell batteries. The method 500 includes balancing a cell voltage for a respective cell of a plurality of voltage cells based on a respective switching control signal at 510. At 520, the method 500 includes providing a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network. At 530, the method 500 dynamically clamping a given pair of adjacent cell inputs by shunting excessive current to inhibit unintended activation of one of the other switching circuits that is coupled to one of the given pair of adjacent cell inputs when balancing the respective voltage cell associated with the given pair of adjacent cell inputs. The method 500 can also include controlling a plurality of switches to enable the current path from each of the plurality of voltage cells. This can include sinking current from the plurality of switches to enable the current path from each of the plurality of voltage cells. The method 500 can also include sourcing current from the plurality of switches to enable the current path from each of the plurality of voltage cells.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a cell balancing network comprising a plurality of separate switching circuits M, M−1, each being configured to balance a respective cell voltage for a respective cell of a plurality of voltage cells based on a respective switching control signal; and
   a control circuit comprising a plurality of current sources, each of the plurality of current sources selectively connected to a respective one of the separate switching circuits to independently control operation of each of the separate switching circuits of the cell balancing network to balance the voltage across the plurality of voltage cells;
   further comprising an adaptive clamp circuit comprising a plurality of NMOS devices connected at the respective source leads of the devices to inhibit the separate switching circuit M−1 from being turned on when commanded to be turned off by the control circuit while the separate switching circuit M is commanded to be turned on.

2. The circuit of claim 1, wherein the separate switching circuit includes a field effect transistor (FET) or a junction transistor responsive to the respective switching control signal.

3. The circuit of claim 2, wherein each of the separate switching circuits is connected to a current sink of the control circuit to provide the current path for the respective cell.

4. The circuit of claim 2, wherein each of the separate switching circuits is connected to a current source of the control circuit to provide the current path for the respective cell.

5. The circuit of claim 1, wherein the cell balancing network comprises a resistor and capacitor filter to facilitate the balancing of the voltage across each of the plurality of cells.

6. The circuit of claim 1, further comprising an adaptive clamp circuit connected between each pair of adjacent cell inputs, each adaptive clamp circuit being configured to shunt excessive current to inhibit unintended activation of one of the separate switching circuits that is coupled to the pair of adjacent cell inputs when another of the pair is balancing.

7. The circuit of claim 6, wherein the control circuit comprises controllable switches that enable current sinks or current sources to facilitate the balancing of the voltage across each of the plurality of cells, and wherein the control circuit employs a controller that executes a switching algorithm to control the controllable switches that enable the current sinks or the current sources to facilitate the balancing of the voltage across each of the plurality of cells.

8. The circuit of claim 6, wherein the control circuit employs a logic circuit to control the controllable switches that enable the current sinks or the current sources to facilitate the balancing of the voltage across each of the plurality of cells.

9. A circuit comprising:
   a cell balancing network comprising a plurality of separate switching circuits M, M−1, each being configured to balance a respective cell voltage for a respective cell of a plurality of voltage cells based on a respective switching control signal; and
   a control circuit comprising a plurality of current sources, each of the plurality of current sources selectively connected to a respective one of the separate switching circuits to independently control operation of each of the separate switching circuits of the cell balancing network to balance the voltage across the plurality of voltage cells further comprising an adaptive clamp circuit comprising PMOS devices connected at the respective source leads of the devices to inhibit the separate switching circuit M−1 from being turned on when commanded to be turned off by the control circuit while the separate switching circuit M is commanded to be turned on.

10. A circuit comprising:
    a cell balancing network comprising separate switching circuits, each being configured to balance a respective cell voltage for a respective cell of a plurality of voltage cells M, M−1 the based on a respective switching control signal;
    a control circuit connected to provide a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network; and
    an adaptive clamp circuit connected between each pair of adjacent cell inputs, each adaptive clamp circuit being configured to shunt excessive current to inhibit unintended activation of one of the separate switching circuits M−1that is coupled to the pair of adjacent cell inputs when another of the pair of adjacent cells is being balanced by clamping voltage at cell M and to value substantially the voltage of a cell N-1 to prevent turn on of the separate switching circuit for cell M−1, wherein each of the separate switching circuits is connected to a current sink of the control circuit to provide the current path for the respective cell and wherein the adaptive clamp circuit further comprises NMOS devices connected at the respective source leads of the devices to inhibit the separate switching circuit from being turned on when commanded to be turned off by the control circuit.

11. The circuit of claim 10, wherein each of the separate switching circuits is connected to a current source of the control circuit to provide the current path for the respective cell.

12. The circuit of claim 10, wherein the control circuit comprises controllable switches that enable current sinks or current sources to facilitate the balancing of the voltage across each of the plurality of cells, and wherein the control circuit employs a controller that executes a switching algorithm to control the controllable switches that enable the current sinks or the current sources to facilitate the balancing of the voltage across each of the plurality of cells.

13. A circuit comprising:
    a cell balancing network comprising separate switching circuits, each being configured to balance a respective cell voltage for a respective cell of a plurality of voltage cells M, M−1 the based on a respective switching control signal;
    a control circuit connected to provide a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network; and
    an adaptive clamp circuit connected between each pair of adjacent cell inputs, each adaptive clamp circuit being configured to shunt excessive current to inhibit unintended activation of one of the separate switching circuits M−1 that is coupled to the pair of adjacent cell inputs when another of the pair of adjacent cells is being balanced by clamping voltage at cell M and to value substantially the voltage of a cell M−1 to prevent turn on of the separate switching circuit for cell M−1, wherein each of the separate switching circuits is connected to a current source of the control circuit to provide the current path for the respective cell and wherein the adaptive clamp circuit further comprises PMOS devices connected at the respective source leads of the devices to inhibit the separate switching circuit from being turned on when commanded to be turned off by the control circuit.

14. A method comprising:
    balancing a cell voltage for a respective cell of a plurality M, M−1, of voltage cells based on a respective switching control signal;
    providing a current path from each of the plurality of voltage cells to a respective cell input of the control circuit to balance the voltage across the plurality of voltage cells, each respective cell input of the control circuit further providing the respective switching control signal to independently control operation of each of the separate switching circuit of a cell balancing network; and
    dynamically clamping a given pair of adjacent cell inputs by shunting excessive current to inhibit unintended activation of one of the other switching circuits that is coupled to one of the given pair of adjacent cell inputs when another of the pair of adjacent cells is being balanced by clamping voltage at cell N and to value substantially the voltage of a cell M−1 to prevent turn on of the separate switching circuit for cell M−1.

15. The method of claim 14, further comprising controlling a plurality of switches to enable the current path from each of the plurality of voltage cells.

16. The method of claim 15, further comprising sinking current from the plurality of switches to enable the current path from each of the plurality of voltage cells.

17. The method of claim 15, further comprising sourcing current from the plurality of switches to enable the current path from each of the plurality of voltage cells.

18. A circuit comprising:
    a cell balancing network comprising separate switching circuits, each being configured to balance a respective cell voltage M, M−1 for a respective cell of a plurality of voltage cells based on a respective switching control signal;

a control circuit connected to provide a current path from each of the plurality of voltage cells to a respective cell input of the control circuit to balance the voltage across the plurality of voltage cells, each respective cell input of the control circuit further providing the respective switching control signal to independently control operation of each of the separate switching circuits of the cell balancing network, wherein each of the separate switching circuits is connected to a current sink of the control circuit to provide the current path for the respective cell or is connected to a current source of the control circuit to provide the current path for the respective cell, wherein the control circuit comprises controllable switches that enable current sinks or current sources to facilitate the balancing of the voltage across each of the plurality of cells; and an adaptive clamp circuit connected between a given pair of adjacent cell inputs by shunting excessive current to inhibit unintended activation of ane-ef the a separate switching circuit M−1 that is coupled to the pair of adjacent cell inputs when balancing the respective voltage cell N associated with the given pair of adjacent cell inputs by clamping voltage at cell N to a value substantially the voltage at cell M−1 to prevent turn on of the separate switching circuit for cell M−1.

* * * * *